US012574236B2

(12) United States Patent
Sukhomlinov et al.

(10) Patent No.: US 12,574,236 B2
(45) Date of Patent: Mar. 10, 2026

(54) STATEFUL HASH-BASED SIGNING WITH A SINGLE PUBLIC KEY AND MULTIPLE INDEPENDENT SIGNERS

(71) Applicant: Google LLC, Mountain View, CA (US)

(72) Inventors: Vadim Sukhomlinov, Santa Clara, CA (US); Andrey Vadimovich Pronin, Sunnyvale, CA (US); Jett Rink, Broomfield, CA (US); Stefan Kölbl, Zurich (CH)

(73) Assignee: Google LLC, Mountain View, CA (US)

( * ) Notice: Subject to any disclaimer, the term of this patent is extended or adjusted under 35 U.S.C. 154(b) by 93 days.

(21) Appl. No.: 18/699,722

(22) PCT Filed: Oct. 15, 2021

(86) PCT No.: PCT/US2021/055170
§ 371 (c)(1),
(2) Date: Apr. 9, 2024

(87) PCT Pub. No.: WO2023/063957
PCT Pub. Date: Apr. 20, 2023

(65) Prior Publication Data
US 2024/0413994 A1     Dec. 12, 2024

(51) Int. Cl.
*H04L 9/30*          (2006.01)
(52) U.S. Cl.
CPC ................................... *H04L 9/3073* (2013.01)
(58) Field of Classification Search
CPC ............. H04L 2209/125; H04L 9/0897; H04L 9/3073; H04L 9/3239; H04L 9/3247
See application file for complete search history.

(56) References Cited

U.S. PATENT DOCUMENTS

| | | | | |
|---|---|---|---|---|
| 5,432,852 A | * | 7/1995 | Leighton | H04L 9/3247 |
| | | | | 713/180 |
| 7,434,046 B1 | * | 10/2008 | Srivastava | H04L 9/0891 |
| | | | | 713/168 |

(Continued)

FOREIGN PATENT DOCUMENTS

| | | | |
|---|---|---|---|
| JP | 2017050580 A | * | 3/2017 |
| JP | 2018523369 A | | 8/2018 |
| WO | 2023063957 | | 4/2023 |

OTHER PUBLICATIONS

Buchmann, Johannes, Erik Dahmen, and Michael Szydlo. "Hash-based Digital Signature Schemes." Oct. 2008. (Year: 2008).*

(Continued)

*Primary Examiner* — Michael Simitoski
(74) *Attorney, Agent, or Firm* — Colby Nipper PLLC

(57) ABSTRACT

This document describes techniques and apparatuses directed at stateful hash-based signing with a single public key and multiple independent signers. Upon obtaining a Leighton-Micali signature (LMS) randomized parameter, a provisioning server may share the LMS randomized parameter among multiple signers. Next, the provisioning server may associate a unique, starting leaf index number to each signer and notify each of the signers. The signers may then create a random SEED for Leighton-Micali one-time signature (LM-OTS) signatures and generate local LM-OTS and LMS public keys. After generating the local public keys, the signers may share local LMS public keys with the provisioning server. Upon receipt of the local LMS public keys, the provisioning server may then order the local LMS public keys and generate a common LMS public key. The provisioning server can then provision the ordered list, the common LMS public key, and a Merkle tree path to each of the signers.

20 Claims, 7 Drawing Sheets

(56) References Cited

U.S. PATENT DOCUMENTS

| | | | | |
|---|---|---|---|---|
| 10,425,401 B1 * | 9/2019 | Pecen | | H04L 63/0815 |
| 10,581,616 B1 * | 3/2020 | Paruzel | | H04L 9/3247 |
| 2013/0083926 A1 * | 4/2013 | Hughes | | H04L 9/3247 |
| | | | | 380/278 |
| 2017/0230182 A1 * | 8/2017 | Misoczki | | H04L 9/3255 |
| 2017/0272250 A1 * | 9/2017 | Kaliski, Jr. | | H04L 9/3239 |
| 2018/0183601 A1 * | 6/2018 | Campagna | | G06F 21/602 |
| 2019/0319797 A1 * | 10/2019 | Suresh | | H04L 9/0869 |
| 2019/0319798 A1 * | 10/2019 | Chalkias | | H04L 9/3236 |
| 2019/0319800 A1 * | 10/2019 | Misoczki | | H04L 9/0662 |
| 2019/0319802 A1 * | 10/2019 | Misoczki | | H04L 9/3247 |
| 2020/0076571 A1 * | 3/2020 | Natarajan | | H04L 9/50 |
| 2021/0119789 A1 * | 4/2021 | Ghosh | | H04L 9/0861 |
| 2021/0119799 A1 * | 4/2021 | Ghosh | | H04L 9/3213 |
| 2021/0306155 A1 * | 9/2021 | Sastry | | H04L 9/3236 |
| 2022/0086009 A1 * | 3/2022 | Vacek | | H04L 9/0877 |
| 2023/0006836 A1 * | 1/2023 | Carter | | H04L 9/3239 |
| 2023/0308287 A1 * | 9/2023 | Pettit | | H04L 9/50 |
| 2024/0039734 A1 * | 2/2024 | De Santis | | H04L 9/3236 |
| 2024/0422005 A1 * | 12/2024 | Sukhomlinov | | H04L 9/3236 |
| 2025/0125972 A1 * | 4/2025 | Pettit | | H04L 9/3247 |

OTHER PUBLICATIONS

K. Chalkias, J. Brown, M. Hearn, T. Lillehagen, I. Nitto and T. Schroeter, "Blockchained Post-Quantum Signatures," 2018 IEEE International Conference on Internet of Things (iThings), 2018, pp. 1196-1203. (Year: 2018).*

Cooper, David A., et al. "Recommendation for stateful hash-based signature schemes." NIST Special Publication 800.208 (2020):800-208. (Year: 2020).*

M. F. Ezerman, H. T. Lee, S. Ling, K. Nguyen and H. Wang, "Provably Secure Group Signature Schemes From Code-Based Assumptions," in IEEE Transactions on Information Theory, vol. 66, No. 9, pp. 5754-5773, Sep. 2020, doi: 10.1109/TIT.2020.2976073. (Year: 2020).*

Nguyen, Khoa, et al. "New code-based privacy-preserving cryptographic constructions." International Conference on the Theory and Application of Cryptology and Information Security. Cham: Springer International Publishing, 2019. (Year: 2019).*

O. Potii, Y. Gorbenko and K. Isirova, "Post quantum hash based digital signatures comparative analysis. Features of their implementation and using in public key infrastructure," 2017 4th International Scientific-Practical Conference Problems of Infocommunications. , 2017, pp. 105-109. (Year: 2017).*

Shafieinejad, Masoumeh, and Navid Nasr Esfahani. "A scalable post-quantum hash-based group signature." Designs, Codes and Cryptography 89.5 (2021): 1061-1090. (Year: 2021).*

"International Search Report and Written Opinion", Application No. PCT/US2021/055170, Jul. 8, 2022, 12 pages.

Bansarkhani, et al., "G-Merkle: A Hash-Based Group Signature Scheme from Standard Assumptions", Apr. 1, 2018, pp. 441-463.

Mcgrew, et al., "State Management for Hash-Based Signatures", Nov. 2, 2016, pp. 244-260.

Suhail, et al., "On the Role of Hash-Based Signatures in Quantum-Safe Internet of Things: Current Solutions and Future Directions", Jan. 1, 2021, 17 pages.

"International Preliminary Report on Patentability", Application No. PCT/US2021/055170, Apr. 16, 2024, 8 pages.

\* cited by examiner

Processor(s)
106

Computer-Readable
Media
108

Computer-Readable Storage
Media
110

Operating System
112

Software Development
Environment Module
114

I/O Ports
116

Communication System
118

202

204

Input/Output Port
206

Microcontroller(s)
208

Processor(s)
210

Cryptographic Engine
212

Computer-Readable
Media
214

Computer-Readable Storage
Media
216

Signer Module
218

Private Key
220

700

STATEFUL HASH-BASED SIGNING WITH A SINGLE PUBLIC KEY AND MULTIPLE INDEPENDENT SIGNERS

RELATED APPLICATION(S)

This application is a national stage entry of International Application No. PCT/US2021/055170, filed Oct. 15, 2021, the disclosure of which is incorporated herein by reference in its entirety.

BACKGROUND

Internet-of-Things (IoT) devices make significant contributions to modern society, such as in the realms of safety, transportation, communication, and manufacturing. An aspect of what makes IoT devices so useful is their ability to be periodically updated, thereby correcting or enhancing certain software features. If, however, a bad actor managed to deliver malware to an IoT device, disguised as a firmware update, then the device could malfunction, expose sensitive data, or operate unsafely. To thwart such cyberattacks, numerous security measures are implemented on computing devices to prevent unauthorized access to and manipulation of device data and communications. These security measures may include utilizing digital signature schemes based on asymmetric encryption algorithms including Rivest-Shamir-Adleman (RSA) and Elliptic Curve Digital Signature Algorithm (ECDSA). Such digital signature schemes are mathematical schemes employed to validate the authenticity and integrity of a message, software, or digital document. These digital signature schemes give a recipient of a message the confidence to know that the message was generated by a known sender and that it was not manipulated sometime during transmission.

The security of many of these asymmetric encryption algorithms is contingent on the difficulty of solving integer factorization problems, general discrete logarithm problems, and elliptic-curve discrete logarithm problems using classical computing techniques. This assumption, specifically the utilization of only classical computing techniques, can no longer be relied upon, due to the development in quantum computing. For example, quantum computing algorithms, such as Shor's algorithm, may provide a quadratic speedup for brute-force searches, undermining the security behind solving integer factorization problems, general discrete logarithm problems, and elliptic-curve discrete logarithm problems. As a result, a bad actor with the help of a quantum computer may be able to decrypt messages or even forge digital signatures on arbitrary messages and potentially inject malware into IoT devices.

In response, hash-based signature schemes believed to be secure against cyberattacks performed by quantum computers have been standardized. For instance, the National Institute of Standards and Technology (NIST) Special Publication (SP) 800-208 provides a Recommendation for Stateful Hash-Based Signature Schemes theorized to be resistant to quantum-computer cyberattacks. The security of these stateful hash-based signatures schemes depends on the security of the underlying cryptographic hash functions.

Current techniques enable efficient implementation of hash-based signature schemes on a single signing service, such as a contemporary server owning all private keys. In such implementations, the signing service may possess the computational capacity required to implement key generation and key signing. Yet, such an implementation may be ineffective when accessing the signing service proves to be difficult or unreliable, such as when a firewall is present. For example, development teams in various nations may be incapable of accessing a server due to a firewall, and as a result, may be unable to sign firmware updates.

SUMMARY

This document describes techniques and apparatuses directed at stateful hash-based signing with a single public key and multiple independent signers. Upon obtaining a Leighton-Micali signature (LMS) randomized parameter, a provisioning server may share the LMS randomized parameter among multiple signers. Next, the provisioning server may associate a unique, starting leaf index number to each signer and notify each of the signers. The signers may then create a random SEED for Leighton-Micali one-time signature (LM-OTS) signatures and generate local LM-OTS and LMS public keys. After generating the local public keys, the signers may share local LMS public keys with the provisioning server. Upon receipt of the local LMS public keys, the provisioning server may then order the local LMS public keys and generate a common LMS public key. The provisioning server can then provision the ordered list, the common LMS public key, and a Merkle tree path to each of the signers.

This Summary is provided to introduce simplified concepts for stateful hash-based signing with a single public key and multiple independent signers, which is further described below in the Detailed Description and is illustrated in the Drawings. This Summary is not intended to identify essential features of the claimed subject matter, nor is it intended for use in determining the scope of the claimed subject matter.

BRIEF DESCRIPTION OF THE DRAWINGS

The details of one or more aspects for stateful hash-based signing with a single public key and multiple independent signers are described in this document with reference to the following drawings.

The use of same numbers in different instances may indicate similar features or components.

DETAILED DESCRIPTION

Overview

Figure 1:
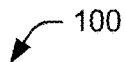
FIG. 1 illustrates an example operating environment including an example computing device.

Advances in the fields of cryptanalysis and quantum computing may undermine the security of many digital signature schemes. Once large-scale quantum computers are developed, for example, it is anticipated that these computers may be capable of performing attacks based on algorithms, such as Shor's algorithm, to overcome most of the public key cryptosystems currently employed. The goal of post-quantum cryptography is to anticipate a future cryptographic operating context where quantum computers may exist, and to develop cryptosystems resistant to potential, future attacks from these quantum computers. As a result, post-quantum cryptosystems (e.g., systems secure against quantum computers having many qubits) have been standardized. Of the standardized and presently defined post-quantum cryptosystems, many techniques are outlined in the assumption of a single signing service owning all private keys and implementing a stateful hash-based signature scheme. Many such implementations of post-quantum cryptosystems may not be desirable in some instances. For example, when accessing the signing service having all the private keys may be difficult, or in some instances impossible, such as when a firewall is present.

In contrast, this document describes techniques and apparatuses directed at stateful hash-based signing with a single public key and multiple independent signers. Through these techniques, multiple offline signers can implement a stateful hash-based signature scheme in secure but low-performance circuitry, enabling them to independently sign a single-level Merkle tree.

Hash-Based Signature Schemes

Hash-based signature (HBS) schemes combine a one-time signature (OTS) scheme with a Merkle tree structure. An OTS scheme is a digital signature scheme that employs a one-way function (e.g., a function for which it is practically infeasible to invert or reverse a computation) to securely sign one message per key pair. An OTS scheme should only be used to sign a single message because the system may become less secure if more than one message is signed using the same public and private key pair. If more than one message is signed using the same public and private key pair, it becomes mathematically feasible for an attacker to forge a digital signature. Since an OTS scheme key should only sign a single message securely, it is practical to combine many such keys within a single, larger structure (e.g., a Merkle tree).

In order to avoid the reuse of an OTS key, the state of the private key may be updated each time a signature is generated. HBS schemes that implement OTS keys and update the private key can therefore be described as stateful (e.g., a process performed with the context of previous transactions). For example, if a private key is stored in non-volatile memory, then the state of the key may be updated in the non-volatile memory to mark an OTS key as unavailable before the corresponding signature that was generated using the OTS key is exported.

Stateful HBS schemes are only as secure as the level of security afforded by the underlying one-way function of the OTS scheme. For example, a stateful OTS scheme is secure insofar as it is infeasible to find a preimage or a second preimage of the digest computed by the one-way function. An exemplary one-way function includes a hash function. OTS schemes that use hash functions to compute a one-time signature are believed to be impervious to large-scale quantum computers. Hash functions may include, for instance, a secure hashing algorithm (SHA) (e.g., SHA-256, SHA-256/192, SHAKE256/256, SHAKE256/192). These hash functions can input any of a variety of computer-interpretable objects and output a fixed-size string (e.g., a hexadecimal number). Hash functions generally have useful cryptographic properties such as preimage resistance (e.g., irreversibility) and collision resistance.

The Leighton-Micali signature (LMS) scheme is an example stateful HBS scheme that may implement a hash function and an OTS scheme. For example, the LMS scheme may implement the Leighton-Micali one-time signature (LM-OTS) scheme as its OTS scheme. LM-OTS signatures may be used to validate the authenticity of a message by associating a secret private key with a shared public key. In the LMS scheme, a private key may include a large set (e.g., an array) of LM-OTS private keys. When generating a key pair for an LMS instance, each LM-OTS key in the system may use the same parameter set, as outlined in section four of the NIST SP 800-208. An LM-OTS public key may be generated from a private key by iteratively applying a hashing function and then hashing the resulting values. The hash function used for the LMS scheme may be the same as the function used in the LM-OTS keys. The format of an LM-OTS private key may be of any configuration defined by the implementation of the system. For example, the private key may include a typecode indicating the particular LM-OTS algorithm, an array containing n-byte strings (e.g., the value of n is determined by the hash function selected for use as part of the LM-OTS algorithm), a parameter (e.g., a 16-byte string parameter that indicates which Merkle tree the LM-OTS is used with), and a 4-byte parameter (e.g., a 32-bit integer parameter that indicates the leaf of the Merkle tree where the OTS public key appears).

The LMS scheme may combine the LM-OTS scheme with a Merkle tree structure. For example, each LMS public and private key pair may be associated with a perfect binary Merkle tree. A Merkle tree is a non-linear, binary data structure, having leaf nodes, a group of middle nodes, and a root node. The leaf nodes may include the hash value of a data element. Each middle node of the Merkle tree may be computed by applying the hash function to the concatenation of the values of its two, corresponding children nodes. The root node may be a singular final node of the Merkle tree. The utilization of a Merkle tree may enable a system to identify and/or verify a particular data element without having to access the full data set.

Further, a Merkle tree can provide an efficient method by which to bind together a large number of OTS instances under a single public key. For example, a Merkle tree may utilize $2^n$ OTS instances whose public keys are hashed together via a binary Merkle tree to generate a single public key. In so doing, the single public key may bind all of the OTS instances together, enabling the generation of $2^n$ signatures from the single public key. Each leaf of the Merkle tree can contain the value of the public key of an LM-OTS public and private key pair. The value contained by the root of the Merkle tree may be the LMS public key (e.g., a recursive hash of the OTS public keys). The private key of the Merkle tree may be the collection of all the OTS private keys, together with the index of the next OTS private key with which to sign the next message.

A hierarchical signature scheme (HSS) may be built on top of an LMS scheme, allowing for efficient scaling to a larger number of signatures. A sequence of Merkle trees may be included in the HSS system. For example, a Merkle tree can be subdivided into a number of smaller trees. Only the bottommost Merkle tree may be used to sign messages, while the Merkle trees, or parts of the larger Merkle tree, above may be used to sign the public keys of their children.

In this document, techniques are described that are implementation compatible with a 1-layer HSS system, while fulfilling NIST standards for key generation and maintenance. Each signer can independently generate its own part of a Merkle tree. The following discussion describes operating environments, techniques that may be employed in the operating environments, and example methods. In the context of the present disclosure, reference is made to the operating environment by way of example only.

Operating Environments

The following discussion describes operating environments, techniques that may be employed in the operating environments, and various devices or systems in which components of the operating environments can be embodied. In the context of the present disclosure, reference is made to the operating environments by way of example only.

FIG. 1 illustrates an example operating environment 100 including an example computing device 102. As illustrated in FIG. 1, the computing device 102 is a desktop computer. In other implementations, the computing device 102 may be a laptop, a tablet, or the like. The computing device 102 may provide other functions or include components or interfaces omitted from FIG. 1 for the sake of clarity or visual brevity.

The computing device 102 includes a printed circuit board assembly 104 (PCBA 104) on which components and interconnects of the computing device are embodied. Alternatively or additionally, components of the computing device 102 can be embodied on other substrates, such as flexible circuit material or other insulative material. Although not shown, the computing device 102 may also include a housing, various human-input devices, a display, a battery pack, antennas, and the like. Generally, electrical components and electromechanical components of the computing device 102 are assembled onto a printed circuit board (PCB) to form the PCBA 104. Various components of the PCBA 104 (e.g., processors and memories) are then programmed and tested to verify the correct function of the PCBA 104. The PCBA 104 is connected to or assembled with other parts of the computing device 102 into a housing.

As illustrated, the PCBA 104 includes one or more processors 106 and computer-readable media 108. The processor(s) 106 may be any suitable single-core or multi-core processor (e.g., an application processor (AP), a digital-signal processor (DSP), a central processing unit (CPU), graphics processing unit (GPU)). The processor(s) 106 may be configured to execute instructions or commands stored within the computer-readable media 110 to implement an operating system 112 and a software development environment module 114, which are stored within computer-readable storage media 110. The computer-readable storage media 110 may include one or more non-transitory storage devices such as a random access memory (RAM, dynamic RAM (DRAM), non-volatile RAM (NVRAM), or static RAM (SRAM)), read-only memory (ROM), or flash memory), hard drive, SSD, or any type of media suitable for storing electronic instructions, each coupled with a computer system bus. The term "coupled" may refer to two or more elements that are in direct contact (physically, electrically, magnetically, optically, etc.) or to two or more elements that are not in direct contact with each other, but still cooperate and/or interact with each other.

The PCBA 104 may also include I/O ports 116 and communication systems 118. The I/O ports 116 allow the computing device 102 to interact with other devices or users through peripheral devices. The I/O ports 116 may include any combination of local or external ports, such as universal serial bus (USB) ports, audio ports, Serial ATA (SATA) ports, PCI-express based ports or card-slots, secure digital input/output (SDIO) slots, and/or other legacy ports. Various peripherals may be operatively coupled with the I/O ports 116, such as human-input devices (HIDs), external computer-readable storage media, or other peripherals.

The communication systems 118 enable communication of device data, such as received data, transmitted data, or other information as described herein, and may provide connectivity to one or more networks and other devices connected therewith. Example communication systems include NFC transceivers, WPAN radios compliant with various IEEE 802.15 (Bluetooth®) standards, WLAN radios compliant with any of the various IEEE 802.11 (WiFi®) standards, WWAN (3GPP-compliant) radios for cellular telephony, wireless metropolitan area network (WMAN) radios compliant with various IEEE 802.16 (WiMAX®) standards, infrared (IR) transceivers compliant with an Infrared Data Association (IrDA) protocol, and wired local area network (LAN) Ethernet transceivers. Device data communicated over communication systems 118 may be packetized or framed depending on a communication protocol or standard by which the computing device 102 is communicating. The communication systems 118 may include wired interfaces, such as Ethernet or fiber-optic interfaces for communication over a local network, private network, intranet, or the Internet. Alternatively or additionally, the communication systems 118 may include wireless interfaces that facilitate communication over wireless networks, such as wireless LANs, cellular networks, or WPANs.

Although not shown, the computing device 102 can also include a system bus, interconnect, crossbar, or data transfer system that couples the various components within the device. A system bus or interconnect can include any one or combination of different bus structures, such as a memory bus or memory controller, a peripheral bus, a universal serial bus, and/or a processor or local bus that utilizes any of a variety of bus architectures.

Figure 2:
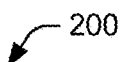
FIG. 2 illustrates an example operating environment including an example portable signing device, which is capable of implementing cryptographic techniques and other security functions described herein.
Figure 2:
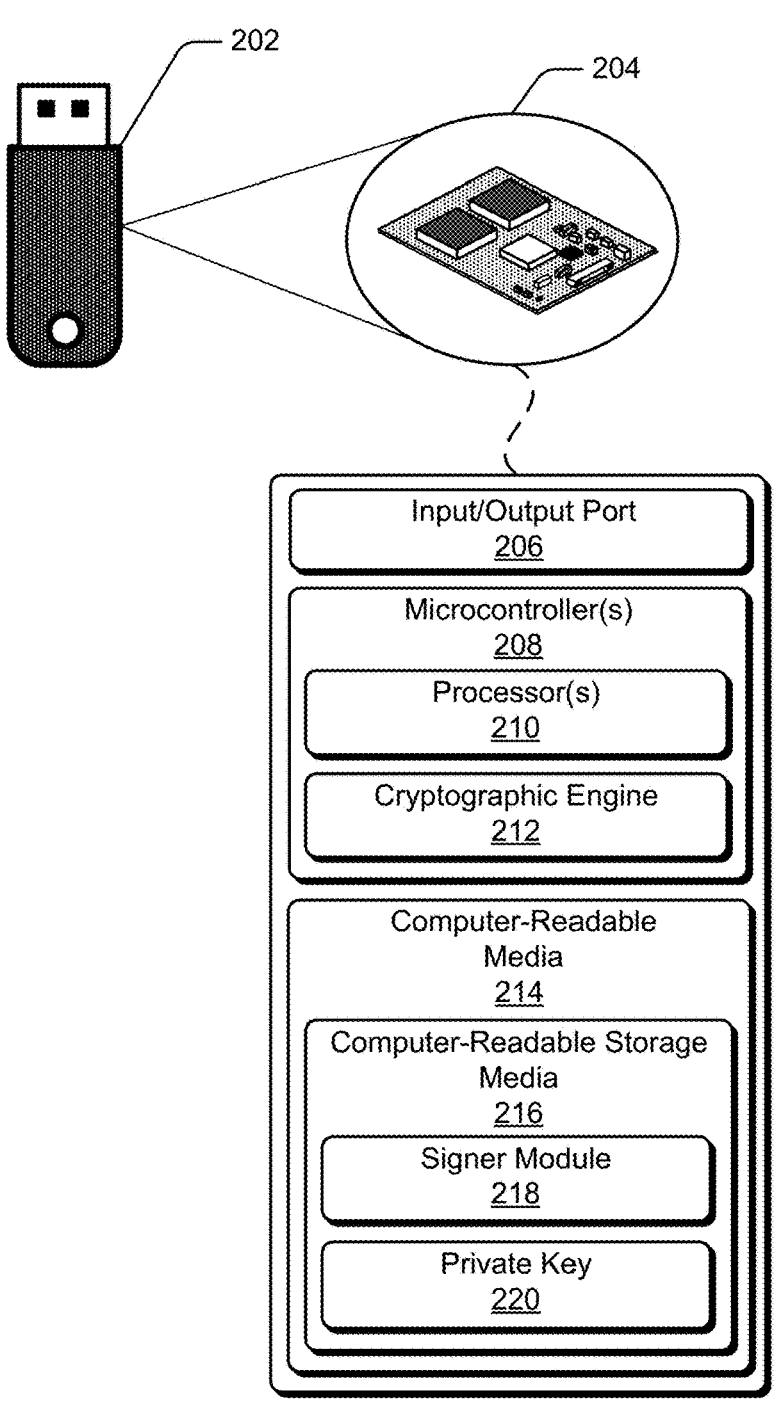

FIG. 2 illustrates an example operating environment 200 that includes an example portable signing device 202, which is capable of implementing cryptographic techniques and other security functions. As illustrated in FIG. 2, the portable signing device 202 is a USB flash drive. In other implementations, the portable signing device 202 may be an external drive or other external hardware security device. The portable signing device 202 may provide other functions or include components or interfaces omitted from FIG. 2 for the sake of clarity or visual brevity.

The portable signing device 202 may include a security-hardened integrated circuit 204 on which components and interconnects of the portable signing device are embodied and to which an input/output (I/O) port 206 is coupled. The I/O port 206 may be a standard USB plug that forms a physical connection with a host (e.g., computing device 102). When the portable signing device 202 is coupled to the host, the portable signing device 202 may receive power and implement cryptographic techniques described herein. In this state, specifically when operably coupled to a host, the portable signing device 202 receives power and implements cryptographic techniques, the portable signing device 202 is referred to herein as a signer.

The portable signing device 202 includes one or more microcontrollers 208 and computer-readable media 214. The microcontroller(s) 208 may enable file transfers between the computing device 102 and the portable signing device 202. The microcontroller(s) 208 may include processor(s) 210 configured to execute instructions or commands stored within the computer-readable storage media 216 to implement a signer module 218. The computer-readable storage media 210 may further store a private key 220. The computer-readable storage media 216 may include one or more non-transitory storage devices such as a RAM, ROM, or flash memory, hard drive, SSD, or any type of media suitable for storing electronic instructions, each coupled with a computer system bus.

The microcontroller(s) 208 may further include a cryptographic engine 212. In various implementations, the cryptographic engine 212 is a secure, root of trust (RoT) component, including a cryptographic coprocessor or processor. The cryptographic engine 212 possesses the computational capacity to perform calculations required to implement steps of key generation and key signing. The cryptographic engine 212 may be communicatively coupled, through private interfaces, to a secure, non-volatile computer-readable storage media 216.

Figure 3:
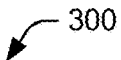
FIG. 3 illustrates an example operating environment including an example provisioning server.
Figure 3:
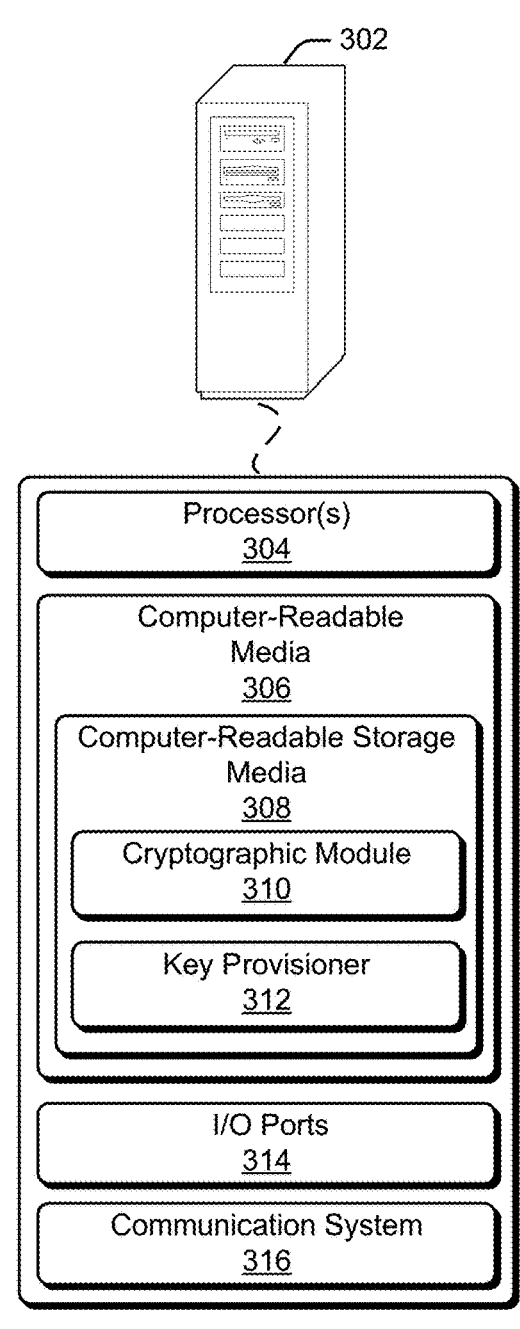

FIG. 3 illustrates an example operating environment 300 that includes an example provisioning server 302. The provisioning server 302 may include processor(s) 304, computer-readable media 306, I/O ports 314, and a communication system 316. Notably, the computer-readable storage media 308 may include a cryptographic module 310 and a key provisioner 312. The cryptographic module 310 may be configured to perform hash operations to compute an LM-OTS public key.

Figure 4:
FIG. 4 illustrates an example operating environment including a computing device operably coupled to multiple signing devices and linked to a provisioning server.
Figure 4:
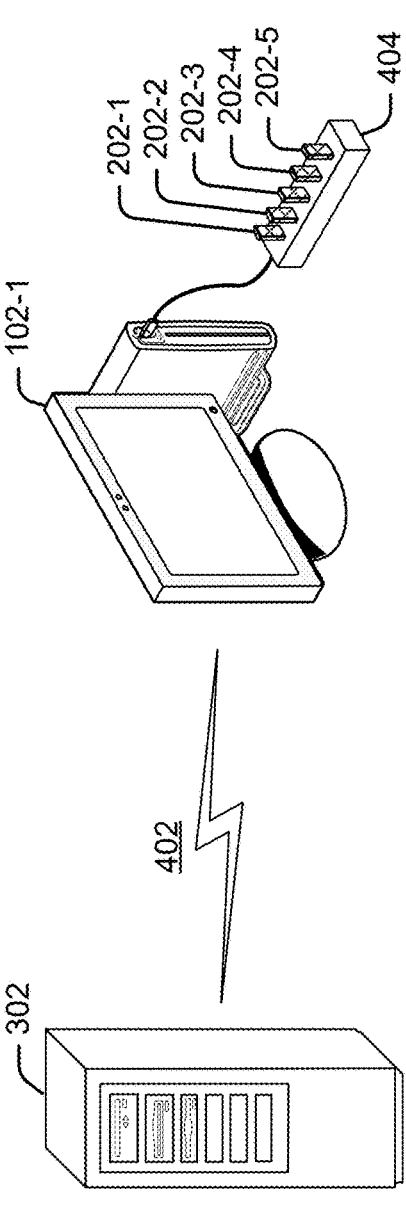

FIG. 4 illustrates an example operating environment 400 including a computing device 102-1 operably coupled to multiple portable signing devices 202 (e.g., portable signing device 202-1, portable signing device 202-2, portable signing device 202-3, portable signing device 202-4, portable signing device 202-5) and linked 402 to the provisioning server 302. The operating environment 400 may include all previous operating environments disclosed herein (e.g., operating environment 100, operating environment 200, operating environment 300). The operating environment 400 may be an air-gapped network (e.g., a network employed on one or more computing devices to ensure that a secure computer network is physically isolated from unsecured networks) defining a secure system. As illustrated, the computing device 102-1 is operably coupled to more than one portable signing device 202 via a USB hub 404. In this example, the five portable signing devices 202 are powered and implement cryptographic techniques, constituting five signers. In other implementations, many more signers may be operably coupled to the computing device 102-1 (e.g., 32 signers).

The computing device 102-1 may be linked 402 to the provisioning server 302. The link 402 may be wirelessly implemented via the communication systems of both devices. Link 402 enables data transfer between the provisioning server 302 and the signers. In some implementations, the signers are operably coupled directly to the provisioning server 302 via the USB hub 404.

Techniques of Key Generation

This section describes techniques of key generation. In portions of the following discussion, reference will be made to operating environment 400 of FIG. 4 by way of example. Such reference is not to be taken as limiting described aspects to operating environment 400 but rather as illustrative of one of a variety of examples. In addition, aspects of the techniques described herein may be reordered, removed, and/or operate in parallel to each other.

Figure 5:
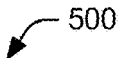
FIG. 5 illustrates an example technique for key generation.
Figure 5:
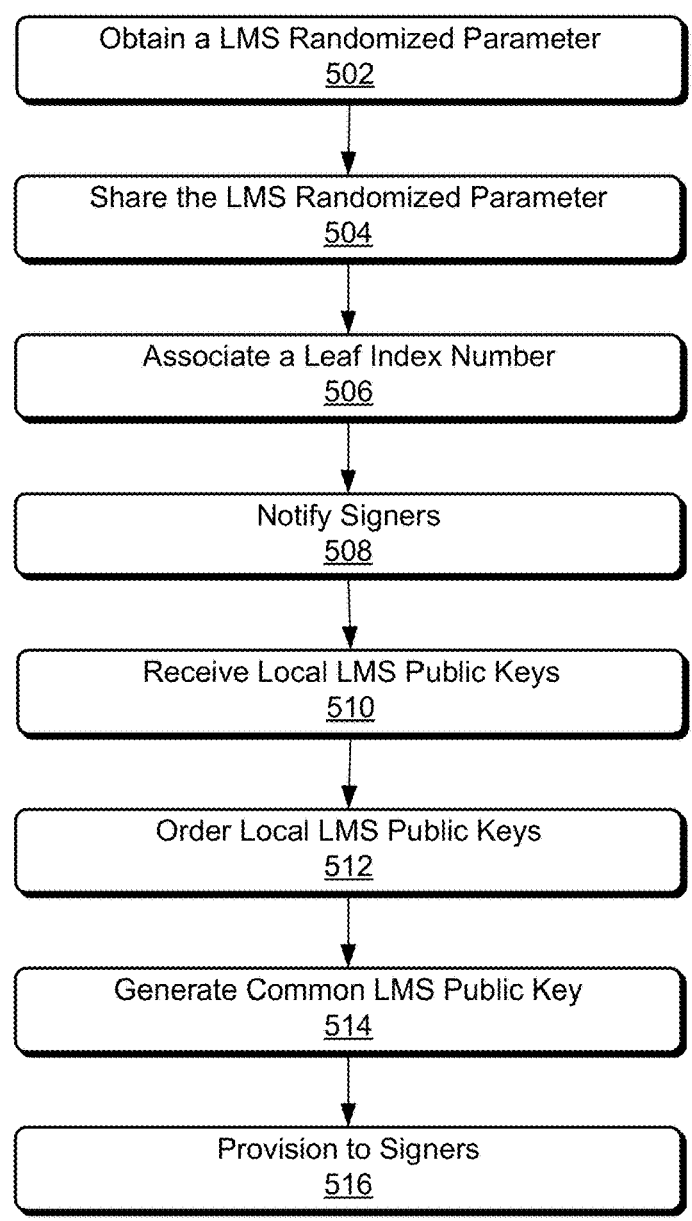

FIG. 5 illustrates an example technique 500 for key generation. In aspects, the techniques and apparatuses described herein for key generation adhere to the NIST SP 800-208 Random Number Generation for Keys and Signatures. In a first aspect, an LMS randomized parameter of the LMS scheme is generated using an approved random bit generator, where the instantiation of the random bit generator supports at least 128 bits of security strength. A signer (e.g., portable signing device 202-1 operably coupled to computing device 102-1) or a provisioning server (e.g., provisioning server 302) may generate the LMS randomized parameter. In a second aspect, the provisioning server obtains the LMS randomized parameter 502. The provisioning server can then share the LMS randomized parameter 504 among each of the signers (e.g., portable signing device 202-1, portable signing device 202-2, portable signing device 202-3, portable signing device 202-4, portable signing device 202-5). The signers may utilize the LMS randomized parameter to "walk up" a Merkle tree. In implementations, parts of the Merkle tree may be independently computed by each of the signers.

In a third aspect, the provisioning server associates a unique, starting leaf index number from 0 to $(2^S)-1$ to each signer 506. In some implementations, the provisioning server associates a unique range of leaf indices.

In a fourth aspect, the provisioning server may notify each of the signers 508. Notifying each of the signers 508 may include transmitting to each of the signers the unique, starting leaf index number with which each signer is associated, a range of leaf indices, and a target height of the Merkle tree. The provisioning server, which may notify each of the signers 508 by transmitting the range of leaf indices, may configure each of the signers to compute a part of the Merkle tree having a predetermined height. Data transmitted during signer notification may facilitate proper maintenance of leaf indices during computation of the Merkle tree.

Next, each signer may create its own random SEED for LM-OTS signatures and generate local LM-OTS and LMS public keys. The random SEED may be a byte-string value that is generated using an approved random bit generator, where the instantiation of the random bit generator supports a predetermined security strength. The SEED may be a secret random value used for pseudorandom key generation that is not disclosed outside of each respective portable signing device. The same SEED value may be used to generate every private element in a single LMS instance. In some implementations, each signer uses its own random SEED for its own part (e.g., sector, partition) of the Merkle tree.

The local LM-OTS and LMS keys may be generated as though the resulting Merkle tree will be a reduced Merkle tree. For example, an HBS scheme of $2^{20}$ size may only be a size of $2^{15}$ for 32 signers. In an implementation, key generation may be performed completely independently by the signers. For example, each signer may independently build a part of the Merkle tree (e.g., the Merkle tree for the HBS scheme), generating local LM-OTS and LMS keys using the common LMS randomized parameter and a secret random SEED. Key generation may take several hours to execute due to the low-performance capabilities of a portable signing device.

In some implementations, a security-hardened portable signing device may not be well-suited for LM-OTS key generation. As a result, a signer may share a first hash of each local LM-OTS private key with the provisioning server, and the provisioning server can continue hash operations to compute the LM-OTS public key. In such an implementation, the provisioning server may include a cryptography module (e.g., cryptographic module 310) and destroy SEEDs after computations. In other implementations, the provisioning server can generate a complete Merkle tree and provision used SEED and at least portions of the Merkle tree back to each signer via the secure link (e.g., link 402).

Once a signer generates its local public keys, the signer may share its local LMS public key (e.g., a root key) with the provisioning server. In a fifth aspect, the provisioning server may receive local LMS public keys 510 from each of the signers over the secure link. Upon receiving the local LMS public keys 510 from each of the signers, or in parallel to the receipt, the provisioning server may implement steps of a key provisioner (e.g., key provisioner 312). In a sixth aspect, the key provisioner may order the received local LMS public keys 512. Ordering of the local LMS public keys 512 may include the key provisioner generating an ordered list.

In a seventh aspect, the provisioning server may generate a common LMS public key 514. For example, the provisioning server can hash the local LMS public keys via a Merkle tree to generate a single common LMS public key. In an eighth aspect, the key provisioner may provision to each of the signers 516 the ordered list, the common LMS public key, and/or a Merkle tree path. The key provisioner of the provisioning server provisioning a Merkle tree path to each signer enables a signer to store a path to the top of the Merkle tree without revealing data or paths of other signers. For example, a signer receives a unique Merkle tree path including a path of its local LMS public key (e.g., leaf) to the common LMS public key (e.g., root).

Once the signers obtain the same common LMS public key 516, the portable signing devices (e.g., portable signing device 202-1, portable signing device 202-2, portable signing device 202-3, portable signing device 202-4, portable signing device 202-5) can be physically distributed. For example, portable signing device 202-1 can be distributed to a development team.

Figure 6:
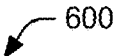
FIG. 6 illustrates an example operating environment including an example portable signing device operably coupled to an example computing device.
Figure 6:
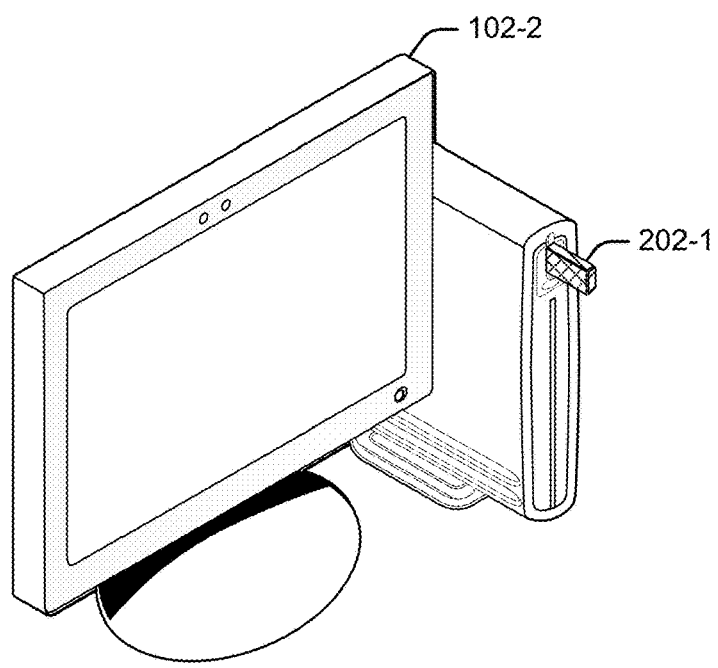

FIG. 6 illustrates an example operating environment 600 including an example portable signing device 202-1 operably coupled to an example computing device 102-2. The computing device 102-2 may include the software development environment module 114. The software development environment module 114 may be a module configured to provide an environment for developing software of a firmware update. The software developed on the computing device 102-2 may be only a portion of a greater firmware update.

Techniques of Key Signing

This section describes techniques of key generation. In portions of the following discussion, reference will be made to operating environment 600 of FIG. 6 by way of example. Such reference is not to be taken as limiting described aspects to operating environment 600 but rather as illustrative of one of a variety of examples.

Figure 7:
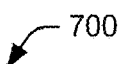
FIG. 7 illustrates an example technique for key signing.
Figure 7:
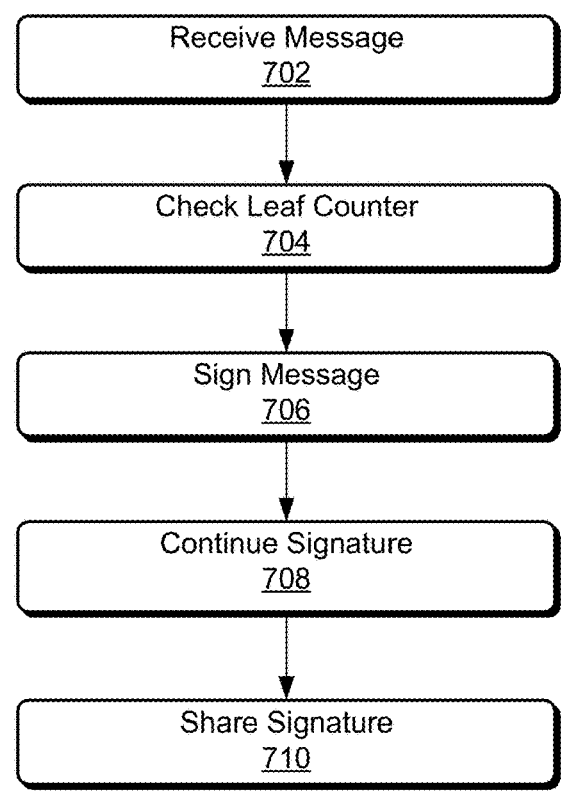

FIG. 7 illustrates an example technique 700 for key signing. In an aspect, a signer (e.g., a portable signing device 202-1 operably coupled to computing device 102-2) may receive a message to sign 702. The signer may then implement steps of a signer module 218. The signer module 218 may operate completely independently on the security-hardened integrated circuit (e.g., security-hardened integrated circuit 204) of the portable signing device. In a first step, the signer module 218 may verify that the used Merkle tree is not exhausted by checking a monotonic leaf counter 704. The leaf counter may count up from 0 to $2^n-1$ within a provisioned range, and increment after each OTS is generated. The leaf counter count can be referred to as the state of the hash-based signature, and its management is critical to ensuring security.

In a second step, the signer module 218 may sign a message 706 either using its own Merkle tree of reduced height or using its own part of the larger Merkle tree. The signer module 218 continues the signature 708 using the provisioned ordered list having the local LMS public keys of other signers to the common LMS public key. Each signer may append its respective Merkle tree path to its signature such that the signature is verifiable with the common LMS public key. The signer module 218 may then share a signature 710. For example, the signer module 218 may share the signature 710 with the computing device 102-2. In such a manner, a signer can independently perform key signing and maintain its own state. In addition, a signer can sign the message using its own SEED coming to its root key and append the path to the top of the Merkle tree which is needed for signature verification. In so doing, the resulting signature size may be smaller than that of comparable HSS schemes. Further, the signing process can be computed quicker than conventional techniques, as each signer can operate on a smaller tree. In addition, because a single-level Merkle tree is produced and a small signature can be achieved, the amount of storage space occupied on a portable signing device can be minimized.

To accelerate the signing process even further, signers may store a cache of local LM-OTS public keys or at least portions of the Merkle tree so as to avoid computationally expensive operations of computing local LM-OTS public keys. The stored cache may reside completely within a computer-readable media (e.g., computer-readable media 214) of a portable signing device. Depending on the storage space available in the portable signing device and the performance-to-space tradeoff, all or some portions of the Merkle tree may be stored.

The techniques described herein relieve the need for a centralized signer who maintains the state of an HBS scheme. Instead, each signer can independently sign without having to access a signing service. Upon generating a signature, a signer may validate the computed signature with common public key. In other implementations, if the provisioning server is secured and accessible by the signers, then the provisioning server can generate a complete Merkle tree and provision used SEED back and/or at least a portion of the Merkle tree to each of the signers using an offline channel. Further to the above descriptions, each of the signers can maintain state within its security-hardened integrated circuitry. In addition, the techniques described herein are fully compatible with the standards outlined in the NIST SP 800-208.

EXAMPLES

In the following section, examples are provided.

Example 1: A computer-implemented method comprising: obtaining a Leighton-Micali signature (LMS) randomized parameter; sharing the LMS randomized parameter among one or more signers; associating a unique, starting leaf index number to each of the signers; notifying each of the signers, the notifying including transmitting to each of the signers the unique, starting leaf index number with which each signer is associated, a range of leaf indices, and a target height of a Merkle tree; receiving a local LMS public key from each of the signers; ordering the received local LMS public keys, the ordering resulting in an ordered list of received local LMS public keys; generating a common LMS public key; provisioning to each of the signers, the provisioning including transmitting the ordered list, the common LMS public key, and a Merkle tree path to each of the signers; and verifying each of the signers, the verifying being the obtaining of the common LMS public key.

Example 2: The computer-implemented method as recited in example 1, wherein the LMS randomized parameter is an LMS key pair identifier.

Example 3: The computer-implemented method as recited in example 1, wherein the signers are portable signing devices operably coupled to a host, the portable signing devices having security-hardened integrated circuitry.

Example 4: The computer-implemented method as recited in example 1, wherein the computer-implemented method is implemented on a provisioning server.

Example 5: The computer-implemented method as recited in example 4, wherein obtaining the LMS randomized parameter includes receiving the LMS randomized parameter, at the provisioning server, from one of the signers.

Example 6: The computer-implemented method as recited in example 4, wherein obtaining the LMS randomized parameter includes generating, at the provisioning server, the LMS randomized parameter.

Example 7: The computer-implemented method as recited in example 4, further comprising implementing, at a cryptographic module of the provisioning server, a stateful hash-based signature (HBS) scheme that combines a one-time signature (OTS) scheme with a Merkle tree structure.

Example 8: The computer-implemented method as recited in example 7, wherein the stateful HBS scheme is an LMS scheme configured to implement SHA-256.

Example 9: The computer-implemented method as recited in example 4, wherein providing the ordered list to the signers enables each of the signers to generate a part of a Merkle tree, the Merkle tree associated with each respective signer.

Example 10: The computer-implemented method as recited in example 4, further comprising computing a Merkle tree and causing each of the signers to cache parts of the Merkle tree to accelerate signing on low-performance hardware.

Example 11: The computer-implemented method as recited in example 4, further comprising provisioning local LMS public keys to each of the signers, effective to cause each of the signers to operate independently after the provisioning.

Example 12: The computer-implemented method as recited in example 4, further comprising computing a local Leighton-Micali one-time signature (LM-OTS) public key, at the provisioning server.

Example 13: The computer-implemented method as recited in example 4, further comprising verifying that each of the signers independently signs with a common LMS public key.

Example 14: The computer-implemented method as recited in example 4, further comprising generating a complete Merkle tree, at the secured and accessible provisioning server, and provisioning used SEED and at least a portion of the Merkle tree back to each of the signers using an offline channel.

Example 15: A provisioning server comprising: at least one processor; and at least one computer-readable storage medium comprising instructions that, when executed by the at least one processor, cause the processor to perform the method of any preceding claim.

CONCLUSION

Although implementations of techniques for, and apparatuses enabling, stateful hash-based signing with a single public key and multiple independent signers have been described in language specific to features and/or methods, it is to be understood that the subject of the appended claims is not necessarily limited to the specific features or methods described. Rather, the specific features and methods are disclosed as example implementations enabling the implementation of stateful hash-based signing with a single public key and multiple independent signers.

What is claimed is:

1. A computer-implemented method comprising:
   obtaining a Leighton-Micali signature (LMS) randomized parameter;
   sharing the LMS randomized parameter among one or more signers;
   associating a unique, starting leaf index number to each of the signers;
   notifying each of the signers, the notifying including transmitting to each of the signers the unique, starting leaf index number with which each signer is associated, a range of leaf indices, and a target height of a Merkle tree;
   receiving a local LMS public key from each of the signers;
   ordering the received local LMS public keys, the ordering resulting in an ordered list of received local LMS public keys;
   generating a common LMS public key;
   provisioning to each of the signers, the provisioning including transmitting the ordered list, the common LMS public key, and a Merkle tree path to each of the signers; and
   obtaining, by each of the signers, the common LMS public key.

2. The computer-implemented method as recited in claim 1, wherein the LMS randomized parameter is an LMS key pair identifier.

3. The computer-implemented method as recited in claim 1, wherein the signers are portable signing devices operably coupled to a host, the portable signing devices having security-hardened integrated circuitry.

4. The computer-implemented method as recited in claim 1, wherein the computer-implemented method is implemented on a provisioning server.

5. The computer-implemented method as recited in claim 4, wherein obtaining the LMS randomized parameter includes receiving the LMS randomized parameter, at the provisioning server, from one of the signers.

6. The computer-implemented method as recited in claim 4, wherein obtaining the LMS randomized parameter includes generating, at the provisioning server, the LMS randomized parameter.

7. The computer-implemented method as recited in claim 4, further comprising implementing, at a cryptographic module of the provisioning server, a stateful hash-based signature (HBS) scheme that combines a one-time signature (OTS) scheme with a Merkle tree structure.

8. The computer-implemented method as recited in claim 7, wherein the stateful HBS scheme is an LMS scheme configured to implement SHA-256.

9. The computer-implemented method as recited in claim 4, wherein providing the ordered list to the signers enables each of the signers to generate a part of the Merkle tree, the Merkle tree associated with each respective signer.

10. The computer-implemented method as recited in claim 4, further comprising computing the Merkle tree and causing each of the signers to cache parts of the Merkle tree to accelerate signing on low-performance hardware.

11. The computer-implemented method as recited in claim 4, further comprising provisioning local LMS public keys to each of the signers, effective to cause each of the signers to operate independently after the provisioning.

12. The computer-implemented method as recited in claim 4, further comprising computing a Leighton-Micali one-time signature (LM-OTS) public key, at the provisioning server.

13. The computer-implemented method as recited in claim 4, further comprising verifying that each of the signers independently signs with a common LMS public key.

14. The computer-implemented method as recited in claim 4, further comprising generating a complete Merkle tree, at the provisioning server, and provisioning a used SEED and at least a portion of the Merkle tree back to each of the signers using an offline channel.

15. A provisioning server comprising:

at least one processor; and at least one computer-readable storage medium comprising instructions that, responsive to execution by the at least one processor, direct the at least one processor to:

obtain a Leighton-Micali signature (LMS) randomized parameter;

share the LMS randomized parameter among one or more signers;

associate a unique, starting leaf index number to each of the signers;

notify each of the signers, the notification including to transmit the unique, starting leaf index number with which each signer is associated, a range of leaf indices, and a target height of a Merkle tree;

receive a local LMS public key from each of the signers;

order the received local LMS public keys to provide an ordered list of received local LMS public keys;

generate a common LMS public key;

provision to each of the signers, the provision including to transmit the ordered list, the common LMS public key, and a Merkle tree path to each of the signers; and obtain, by each of the signers, the common LMS public key.

16. The provisioning server as recited in claim 15, wherein the LMS randomized parameter is an LMS key pair identifier.

17. The provisioning server as recited in claim 15, wherein the signers are portable signing devices operably coupled to a host, the portable signing devices having security-hardened integrated circuitry.

18. The provisioning server as recited in claim 15, wherein to obtain the LMS randomized parameter, the provisioning server receives the LMS randomized parameter from one of the signers.

19. The provisioning server as recited in claim 15, wherein to obtain the LMS randomized parameter, the provisioning server generates the LMS randomized parameter.

20. The provisioning server as recited in claim 15, comprising additional instructions that, responsive to execution by the at least one processor, direct the at least one processor to:

implement, at a cryptographic module of the provisioning server, a stateful hash-based signature (HBS) scheme that combines a one-time signature (OTS) scheme with a Merkle tree structure.

* * * * *